United States Patent
Shima

(10) Patent No.: US 6,466,326 B1
(45) Date of Patent: Oct. 15, 2002

(54) PRINTER AND PRINTING METHOD

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/389,094

(22) Filed: Sep. 2, 1999

(30) Foreign Application Priority Data

Sep. 8, 1998 (JP) .......................................... 10-254365

(51) Int. Cl.[7] .............................................. G06K 15/00
(52) U.S. Cl. .................................... 358/1.12; 358/1.13
(58) Field of Search ................................ 358/1.1, 1.12, 358/1.15, 1.16, 498; 710/8, 14, 16, 19; 399/8, 9, 10, 12, 18, 19, 361, 364; 101/2

(56) References Cited

U.S. PATENT DOCUMENTS

| 4,829,468 A | | 5/1989 | Nonaka et al. |
| 5,047,955 A | | 9/1991 | Shope et al. |
| 6,141,109 A | * | 10/2000 | Yoshida ...................... 358/1.12 |
| 6,330,067 B1 | * | 12/2001 | Murata ....................... 358/1.12 |

FOREIGN PATENT DOCUMENTS

| JP | 8-292855 | 11/1996 | ............. G06F/3/12 |
| JP | 10-138575 | 5/1998 | ............. B41J/5/30 |
| JP | 10-187377 | 7/1998 | ............. G06F/3/12 |
| JP | 11-198488 | 7/1999 | ............ B41J/29/38 |

* cited by examiner

Primary Examiner—Arthur G. Evans
(74) Attorney, Agent, or Firm—Sughrue Mion, PLLC

(57) ABSTRACT

Print requests issued by an interpretation section 13 are stored in an execution or wait queue of a storage section 21 by way of a print request receiving section 22. The print requests stored in the execution queue are input to an engine control section 15. When a report of completion of printing is issued by the engine control section 15, the print requests for which printing has been performed are deleted from the execution queue. In a case where collation printing is specified for the print requests, the print requests for which printing has been performed are transferred from the execution queue to the collation queue and stored therein. Every time one copy of the print job is completed, the print requests stored in the collation queue are again transferred to the execution queue. Collation printing can-be embodied by transfer of the print requests between the execution queue and the collation queue.

14 Claims, 8 Drawing Sheets

*FIG. 5 (f)*
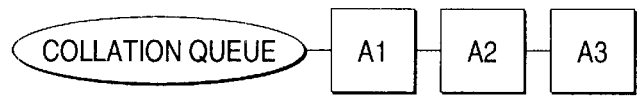
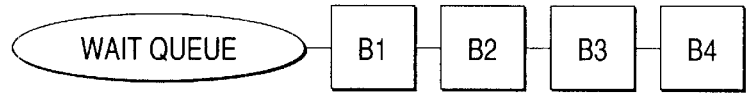
*FIG. 5 (g)*
REPEAT (c) TO (g) ACCORDING TO THE NUMBER OF COPIES
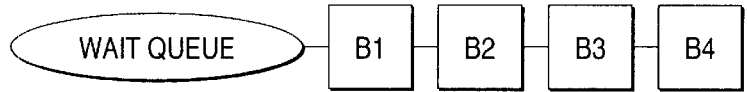
*FIG. 5 (h)*
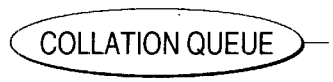
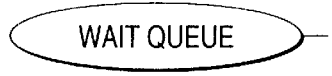
*FIG. 5 (i)*
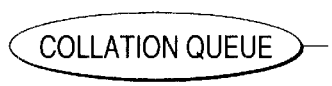

PRINTER AND PRINTING METHOD

BACKGROUND OF THE INVENTION

1. Field of the Invention

The present invention relates to a printer capable of effecting so-called collation printing, as well as to a collation printing method.

The present application is based on Japanese Patent Application No. Hei. 10-254365, which is incorporated herein by reference.

2. Description of the Related Art

A conventional printer; for example, a page printer, interprets print data entered from a host computer and produces image data for printing purpose on a page-by-page basis. The printer then inputs a per-page print request to an engine control section. In response to the thus-input print request, the engine control section activates a print engine to thereby perform a printing operation.

More specifically, the print requests are stored in a print queue in the sequence of issuance, and the print requests are transferred to the engine control section in the sequence of storage. After completion of printing of one page, the engine control section issues a print completion report. In response to the print completion report issued by the engine control section, the print request for which printing has been performed is deleted from the print queue, thereby freeing a memory block. A print request relating to a subsequent page or a print request relating to another print job is stored in the thus-released memory block.

The above printer according to the conventional art issues print requests to thereby perform printing operations in the sequence in which the print requests are received from the host computer. The print requests for which printing has been performed are immediately discarded, thereby releasing memory blocks one after another. Even a print job involving a large quantity of data can be subjected to printing through use of a comparatively small amount of memory. Such a printer reserves available memory by immediately discarding the print requests for which printing has been performed and hence enables so-called copy printing (or stack printing) but is incapable of performing so-called collation printing. Therefore, the printer is poor in terms of ease of use.

Reference is now made to an example in which a print job consisting of a total of three pages; i.e., pg. 1, pg. 2, and pg. 3. In copy printing, each of the pages is continuously printed in only the number corresponding to the number of copies; for example, pg. 1 is printed in the number corresponding to the number of copies, then pg. 2 is printed in the number corresponding to the number of copies, and then pg. 3 is printed in the number corresponding to the number of copies. In contrast, in collation printing, a set of pages arranged in accordance with page numbers, such as a set comprising pg. 1, pg. 2, and pg. 3, is produced in only the number corresponding to the number of copies. In the case of copy printing, immediately after printing of a certain page in the number corresponding to the number of copies, the print request relating to the page becomes unnecessary. The print request relating to the page that has been printed is immediately discarded, thus freeing the memory block. However, in the case of collation printing, print requests relating to all the pages must be retained until completion of printing a set of pages in the number corresponding to the number of copies.

As mentioned previously, collation printing involves an increase in the amount of memory used and hence is little affected by the conventional printer. Further, collation printing requires efforts, such as re-arrangement of sheets that have been printed or repetitions of entry of a print job into the printer in the number corresponding to the number of copies, thus resulting in poor ease-of-use. When pseudo-collation printing is performed; i.e., where a print job is repeatedly transmitted in the number corresponding to the number of copies in such a way as to be invisible to the user. Although the amount of memory required is small, much time is required for transmitting print data. In addition, the print requests relating to all the pages must be repeatedly generated in only the number corresponding to the required number of pages, thus significantly increasing the print time.

It is also conceivable that the amount of memory provided for the printer is increased and that collation printing is performed by reserving a memory block of a predetermined size in advance for collation printing purposes. In this case, however, the printer must determine whether or not a print request corresponds to collation printing. If the print request corresponds to collation printing, there must be performed special processing such as reservation of a memory block of a predetermined size, with the result that memory control becomes complicated and manufacturing costs are increased.

In general, the printer cannot perceive beforehand the amount of memory required for effecting collation printing, and hence the memory block reserved for collation printing may become insufficient or may be greatly in excess of that which is required. Even if the printer is informed in advance of the total number of pages relating to the print job, the amount of memory required by print requests relating to individual pages differs according to print requirements such as print resolution, gradation, and contents (e.g., the amount of graphic data). Accordingly, the printer cannot perceive the amount of memory required for effecting collation printing until print requests relating to all the pages are actually prepared. If the memory block, which has been reserved beforehand, is insufficient, collation printing results in failure, thus subjecting the user to inconvenience. In contrast, if the memory block is of greater size than is necessary, the amount of unused memory increases, thereby diminishing an opportunity to receive another print job. Particularly, in the case of a network printer shared among a plurality of users, if a certain user reserves a memory block greater than that is required in order to perform collation printing, the memory location for storing a print job issued by another user becomes insufficient, thereby resulting in the probability of a drop in overall printing efficiency of the network print system.

It is also conceivable that in order to improve the efficiency of use of memory, the host computer notifies the printer in advance of information about the total number of pages and the resolution and gradation of individual pages so that the printer can perform special processing, such as making a forecast about the amount of memory required by the printer to perform collation printing. Addition of special processing such as that mentioned previously results in complication of a control mechanism, as well as in an increase in manufacturing costs. Since the printer actually prepares print requests, reserving an appropriate amount of memory required for effecting collation printing on the basis of only the information stored in the host computer is difficult. Hence, a sufficient margin of memory block must be ensured.

Some copiers may effect collation printing. Both a copier and a printer process image data and have a commonality in terms of subjecting a recording medium to printing.

However, the copier first reads image data regarding all the pages to be subjected to collation printing and commences collation printing. Unless failures, such as paper jams, otherwise arise, collation printing, once started, will not end in failure for reasons of insufficient memory during the course of printing. In the case of a copier, the amount of image data regarding all the pages to be subjected to collation printing is determined at the time of collation printing.

In contrast, the printer does not perform collation printing by generation of print requests relating to all the pages to be subjected to collation printing but is required to start subjecting print data to collation printing in the sequence of receipt. More specifically, the printer is required to receive print data from the host computer as well as to produce print requests by interpretation of the print data. If the printer awaits generation of print requests relating to all the pages, a print wait time is significantly increased. Further, depending on the amount of memory provided for the printer, memory becomes insufficient during the course of storage of print requests relating to individual pages. Collation printing may end in failure before being started even after the user has waited for a long period of time. As mentioned previously, in contrast with a copier, the printer cannot perceive the amount of memory required for performing collation printing in advance, optimum memory control is difficult even when the printer is equipped with a large amount of memory.

In a printer equipped with a plurality of paper delivery bins, print data are printed in the sequence of page numbers, and printed sheets are delivered to respective paper delivery bins in sequence, thereby effecting pseudo-collation printing. For example, in the case of a printer equipped with three paper delivery bins, a number of copies are duplicated on a per-page basis such as pg. 1-pg. 1-pg. 1; pg. 2-pg. 2-pg. 2; and pg. 3-pg. 3-pg. 3, and the duplicates are delivered to the respective bins while the bins are selected in the sequence of paper delivery bin 1, paper delivery bin 2, and paper delivery bin 3. As a result, a collated set of finished copies can be delivered to each of the paper delivery bins. However, if the number of copies exceeds the number of paper delivery bins, duplicates cannot be collated through delivery to the respective bins.

SUMMARY OF THE INVENTION

The present invention has been conceived to solve the foregoing problems, and the object of the present invention is to provide a printer and a printing method, both of which effect high-speed collation printing by commencing the collation printing before print requests relating to all the pages are generated. Another object of the present invention is to provide a printer and a printing method, both of which effect collation printing through use of a comparatively simple control system even when a small memory block is available. Still another object of the present invention is to readily effect collation printing without use of additional memory or an auxiliary storage device.

In order to solve the previously-described problems, in a printer and under a printing method according to the present invention, when collation printing is specified, print requests to be subjected to collation printing are retained and repeatedly used until printing of a designated number of copies is completed.

According to a first aspect of the present invention, there is provided a printer for effecting predetermined printing by activation of printing means on the basis of input print data, comprising:

receiving means for receiving print data;

interpretation means which interprets the received print data and issues print requests including intermediate code data; and print request manager means which temporarily stores the print requests issued by the interpretation means, prints the thus-stored print requests by entering the print requests into the printing means, and reports to the interpretation means completion of printing of the print requests, on the basis of a report about completion of printing issued by the printing means, wherein in a case where collation printing is specified for the print requests, the print request manager means repeatedly inputs each of the print requests to be subjected to collation printing to the printing means until printing of the designated number of copies is completed.

Here, the expression "collation printings" signifies a mode in which a set of data is printed in a collated manner in a number corresponding to the number of copies. The expression "print request" signifies the information which makes a request for the printing means to effect printing, and can also be called a print request mechanism. More specifically, a print request is prepared for each page to be printed and comprises information required for printing the page, such as paper size, the number of copies in which the page is to be printed, designation of single-sided/double-sided printing, and print data regarding the page. The print data included in the print request may be produced in the form of an intermediate code for directing a memory block where are stored the data required for expanding an image from the print data received from the host computer. Alternatively, the print data may also be produced in the form of bit image data. "Temporal storage of a print request" signifies storage of a print request for a required period of time. Specifically, in the case of ordinary printing, the print request is reserved until a print completion report is issued by the printing means and printing has been performed for the print request. In the case of collation printing, a print request is reserved for a time period during which printing of the designated number of copies is completed or during which printing of the final copy of the designated number of copies is commenced. "Print completion report" sent to the interpretation means signifies reporting to the interpretation, means completion of printing of a certain page. Completion of printing of a certain page is determined by means of the print completion report, thereby freeing a memory block.

The operation of the printer during ordinary printing will be described first. From the print data received by the receiving means, the interpretation means produces image data for printing purpose and issues a print request. The print request is entered into the printing means by way of print request manager means. According to the thus-entered input request, the printing means performs printing and upon completion of the printing operation reports completion of printing to the print request manager means. Upon receipt of the print completion report from the printing means, the print request manager means reports completion of printing of the print request to the interpretation means, thereby deleting the print request, which has been stored and for which printing has been performed, and freeing the memory block. A print request relating to a subsequent page or a print request relating to another print job is stored in the thus-released memory block.

Next, the operation of the printer during collation printing will be described. When the interpretation means issues a print request to be subjected to collation printing, the printing means receives the print request by way of the print request manager means. Next, the printing means issues a print completion report, but the print request manager means does not send any print completion report to the interpretation means but stores the print request in preparation for printing of the second copy of the print request. Until printing of the specified number of copies is completed, the print request manager means repeatedly inputs to the printing means the print request to be subjected to collation printing. Since the already-existing print request is re-used, there is no necessity for generating the print request again. A print time required for printing the second or subsequent copies becomes shorter than that required for printing the first copy. After completion of collation printing, the print request manager means reports completion of printing to the interpretation means every time collation printing of the print request is completed, thus freeing the memory block. The timing at which the print completion report is issued may be defined in a preferred manner, as will be described later.

As mentioned above, the present invention can embody collation printing without reservation of a special memory block for collation printing purpose. Accordingly, memory resources can be efficiently utilized, and collation printing can be effected through use of a simple configuration without complicating memory control or like control.

Preferably, the print request manager means does not send the print completion report to the interpretation means and retains the print request until printing of the final copy of the print request to be subjected to collation printing is commenced. When printing of the final copy is commenced, the print request manager means can also send the print completion report to the interpretation means, on the basis of the print completion report issued by the printing means.

All the print requests can also be reserved without deletion until printing of the final page of the final copy for which collation printing is specified. However, the respective print requests to be subjected to collation printing are used until printing of the final, copy and are not used for printing of another print job. Specifically, the print requests are required to be reserved only for the period between the instant when printing of the first copy is commenced and the instant when printing of the final copy is commenced. Accordingly, the print requests are reserved only for the period until printing of the final copy is commenced. When printing of the final copy is commenced, the print request manager means sends a print completion report to the interpretation means according to the print completion report received from the printing means, thereby deleting the print requests for which printing has been performed and releasing the memory block. Thus, the final copy is printed while the print requests for which printing has been performed are deleted. As a result, collation printing can be completed while the amount of available memory is increased, thereby increasing opportunities to receive another print job at an early time.

Preferably, the print request manager means comprises
   a first queue for processing the print requests stored therein in a predetermined sequence; and
   a second queue for transferring the print requests for which printing has been performed from the first queue and storing the thus-transferred print queues therein when the print completion report is issued by the printing means with regard to the print requests stored-in the first queue. When collation printing of one copy is completed, the print request stored in the second queue is transferred to the first queue, whereby the print requests to be subjected to collation printing can be repeatedly input to the printing means-until printing of the designated number of copies is completed.

The print requests stored in the first queue are input to and printed by the printing means in a predetermined sequence. The expression "predetermined sequence" typically signifies processing of the print requests one by one from the first-arrived print request. Depending on a print mode, the print requests may be processed in a sequence differing from the sequence of storage. For example, when double-side printing is effected at high speed, sheets are continuously subjected to reverse-side printing in only a predetermined number. When the sheets for which reverse-side printing has been performed return to the entry of a printing section by way of a re-feeding path, there may be alternatingly performed front-side printing of the sheet for which reverse-side printing has been performed and reverse-side printing of a new sheet. Finally, only a predetermined number of the sheets for which reverse-side printing has been performed are subjected to front-side printing. In this case, the print requests are not processed in sequence from the head end of the first queue, but the print requests may be processed in sequence suitable for high-speed double-side printing.

When the printing means sends the print completion report to the print request manager means during collation printing, the print requests for which printing has been performed are transferred from the first queue to the second queue and reserved therein. Accordingly, each of the print requests stored in the first queue and to be subjected to collation printing is transferred to the second queue every time printing for the print request is completed. At a point in time when printing of one copy is completed, the first queue becomes empty, and all the print requests to be subjected to collation printing are stored in the second queue. The print requests to be subjected to collation printing can be input again to the printing means by transferring the print requests reserved in the second queue again to the first queue every time one copy of the print job is completed. Thus, employment of two queues enables collation printing through use of a simple configuration. The queue used for printing can be switched between the first queue and the second queue at a point in time when printing of one copy is completed. Switching the queue used for printing through re-definition also falls within the scope of the present invention.

Preferably, until commencement of printing of the final copy relating to the print request to be subjected to collation printing, the print request manager means does not send any print completion report to the interpretation means but transfers the print request between the first queue and the second queue. When printing of the final copy is commenced, the print request manger means sends the print completion report to the interpretation means with regard to the print requests for which printing has been performed, and the print requests for which printing has been performed are not transferred to the second queue but can be deleted from the first queue.

As a result, the final copy can be printed while the print requests for which printing has been performed are deleted to thereby free the memory block.

Preferably, the printer further comprises a pointer for specifying a header address of a next print request to be printed, and a next address designation section which is provided in each of the print requests and is used for designating the header address of the next print request. Further, the print request manager means can transfer the print requests between the first queue and the second queue by re-writing the data stored in the pointer and the address designation sections.

The next print request to be printed can be read according to the address specified by the pointer. Further, each of the print requests is provided with the next address designation section for designating the header address of the next print request. The respective print requests are linked together in sequence. Accordingly, the print requests can be transferred between the first queue and the second queue by re-writing only the data stored in the pointer and the next address designation sections without involvement of changing a destination to which the print requests are stored.

Preferably, the print request manger means monitors whether or not the memory block for storing the print requests becomes insufficient. In the event of occurrence of memory shortage, the directed number of copies can be reset to "1."

According to the present invention, collation printing is effected without reservation of a special memory block for collation printing purpose or without checking the amount of memory required for effecting collation printing beforehand. Therefore, depending on the total number of pages of the print. job, the specified resolution, and the specified gradation, the available storage capacity of the printer may become insufficient. To prevent such memory shortage, the print request manager means monitors whether or not the memory block becomes insufficient. If the memory block is insufficient, the directed number of copies is forcefully reset to "1." As a result, in the event of so-called memory shortage the collation print mode is switched to an ordinary print mode, thereby enabling printing of only one copy of the print job.

Preferably, if memory shortage occurs during the course of storage of the print request relating to the print job for which printing is currently being performed, the print request manager means resets the directed number of copies to "1." If memory shortage occurs during the course of storage of a print request of another print job differing from the preceding print job, generation of the print request relating to the other print job may be suspended until printing of the preceding job is completed.

The expression "a preceding print job for which printing is now performed" signifies a print job for which printing is currently being performed or a print job for which printing will be performed. If the memory block becomes insufficient during the course of storage of print requests relating to the preceding print job, the print job cannot be subjected to collation printing. In such a case, the number of copies is reset to "1" to thereby switch the collation printing to normal printing. In contrast, if the memory block becomes insufficient during the course of storage of print requests relating to another print job, without direct relation to collation printing of the preceding print job, the memory shortage may be eliminated if the printing of the preceding print job is completed to thereby release the memory block. In this case, the print mode is not switched to normal printing, and issuance of print requests relating to another print job is suspended until the printing of the preceding print job is completed.

Preferably, if the directed number of copies is 2 or more, collation printing is deemed as being specified for the print job.

Collation printing is effected only when a plurality of copies are printed. Accordingly, in a case where the number of copies of a print job is 2 or more, collation printing is deemed to be specified for the print job, thereby enabling collation printing without drawing the user's attention. More specifically, for collation printing to be enabled, the user is required to set only the number of copies to a value of 2 or more by way of the host computer. Collation printing can be embodied without modification of software such as a printer driver or a printer utility. For example, a print specification screen provided on the host computer is equipped with a button for use in designating collation printing, and collation printing is specified by means of an input entered by way of the button. Such a configuration also falls within the scope of the present invention.

According to a second aspect of the present invention, there is provided a printing method by which predetermined printing is effected by actuation of printing means on the basis of input print data, comprising the steps of:

monitoring whether or not interpretation means issues a print request on the basis of the input print data;

temporarily storing the print request when the print request is issued;

monitoring whether or not the printing means issues a print completion report with regard to the print request that are stored;

determining whether or not the print request for which the print completion report has been issued is designated to be subjected to collation printing;

determining whether or not the print request for which the print completion report has been issued pertains to the final copy of the designated number of copies in a case where the print request is designated to be subjected to collation printing;

retaining the print request designated to be subjected to collation printing without issuing a print completion report to the interpretation means until the print request for which the print completion report has been issued is determined to pertain to a portion of the final copy;

repeatedly inputting the print requests, which are retained and are designated to be subjected to collation printing, to the printing means according to the number of copies; and issuing the print completion report to the interpretation means on the basis of the print completion report issued by the printing means after the print request, for which the print completion report has been issued, has been determined to pertain to a portion of the final copy.

As a result, an advantageous result identical to that described previously can be yielded.

According to a third aspect of the present invention, there is provided a printing method by which predetermined printing is effected by activation of printing means on the basis of input print data, the method comprising:

a print request receiving process, and a print completion report management process, wherein the print request receiving process includes a step of monitoring whether or not interpretation means issues a print request on the basis of the input print data; and a step of temporarily storing the print request in a first queue when the print request is issued, and the print completion report management process includes a step of monitoring whether or not the printing means issues a print completion report with regard to the print request stored in the first queue;

a step of determining whether or not collation printing is specified for the print request for which the print completion report has been issued when the print completion report is issued;

a step of determining whether or not the print request for which the print completion report has been issued, pertains to a portion of the final copy of the designated number, of copies when collation printing is specified for the print job;

a step of storing into a second queue the print request which is stored in the first queue and for which printing has been performed until the print request for which the print completion report has been issued is determined to pertain to a portion of the final copy;

a step of determining whether or not printing of one copy to be subjected to collation printing is completed;

a step of repeatedly inputting to the input means he print requests to be subjected to collation printing by transferring the print requests retained in the second queue to the first queue according to the number of copies, when one copy of the print request to be subjected to collation printing is completed; and a step of issuing the print completion report to the interpretation means on the basis of the print completion report issued by the printing means after the print request, for which the print completion report has been issued, has been determined to pertain to a portion of the final copy, thereby deleting from the first queue the print request for which printing has been performed.

As a result, an advantageous result identical to that described previously can be yielded. Further, the printing method comprises the print request receiving process and the print completion report management process, and hence storage of newly-issued print requests and completion of processing of the already-issued print requests can be effected independently of each other.

Preferably, the printing method may further comprise a step of monitoring whether or not a memory block for storing the print request becomes insufficient; and a step of resetting the designated number of copies to "1" when the memory block becomes insufficient.

As a result, an advantageous result identical with that designated previously can be yielded.

According to a fourth aspect of the present invention, there is provided a recording medium having recorded thereon a computer program for controlling a printer, wherein the computer program comprises an interpretation function of issuing a print request by interpretation of received print data; and a print request management function of temporarily storing the print request issued by means of the interpretation function, inputting the thus-stored print request to printing means such that the printing means prints performs printing, and issuing to the interpretation function a print completion report with regard to the print request on the basis of the print completion report issued by the printing means; and wherein in a case where collation printing is specified for the print request, the print request management function repeatedly inputs to the printing means the print request to be subjected to collation printing until printing of the designated number of copies is completed.

As the "recording medium," there may be employed; for example, a floppy, disk (FD), a compact disk (CD-ROM or: CD-R), a hard disk drive (HDD), memory, or like recording medium. The recording medium is not limited these exemplary mediums. For instance, a communications medium may also be utilized in the same way as a program remotely downloaded by way of a communication line. As in the case with the first aspect of the present invention, collation printing can be effected by loading the predetermined program recorded on the recording medium into the computer.

According to a fifth aspect of the present invention, there is provided a recording medium on which a computer program for managing a print request issued on the basis of print data is recorded, wherein the program comprises a function for storing the thus-issued print request into a first queue;

a function for determining whether or not collation printing is specified for the print request stored in the first queue;

a function of monitoring whether or not printing means issues a print completion report;

a function for determining whether or not the print request for which the print completion report has been issued pertains to a portion of the final copy of the designated number of copies when collation printing is specified for the print request;

a function for transferring the print request for which printing has been performed to a second queue and retaining the print request in the second queue until the print request for which the print completion report has been issued is determined to pertain to a portion of the final copy;

a function for repeatedly inputting to the printing means the print request to be subjected to collation printing according to the designated number of copies by transferring the print request retained in the second queue to the first queue, when printing of one copy of the print request to be subjected to collation printing is completed; and a function for deleting the print request for which printing has been performed from the first queue on the basis of the print completion report, after the print request, for which the print completion report has been issued, has been determined to pertain to a portion of the final copy.

The print request management means for managing print requests can be embodied through use of two queues, by loading the predetermined computer program into the computer of the printer. As a result, an advantageous result identical with that described previously can be yielded.

Features and advantages of the invention will be evident from the following detailed description of the preferred embodiments described in conjunction with the attached drawings.

BRIEF DESCRIPTION OF THE DRAWINGS

In the accompanying drawings:

FIG. 5 is similar to FIG. 4 and follow the same;

DETAILED DESCRIPTION OF THE PREFERRED EMBODIMENTS

Preferred embodiments of the present invention will be described in detail hereinbelow by reference to the accompanying drawings.

First Embodiment

Figure 1:
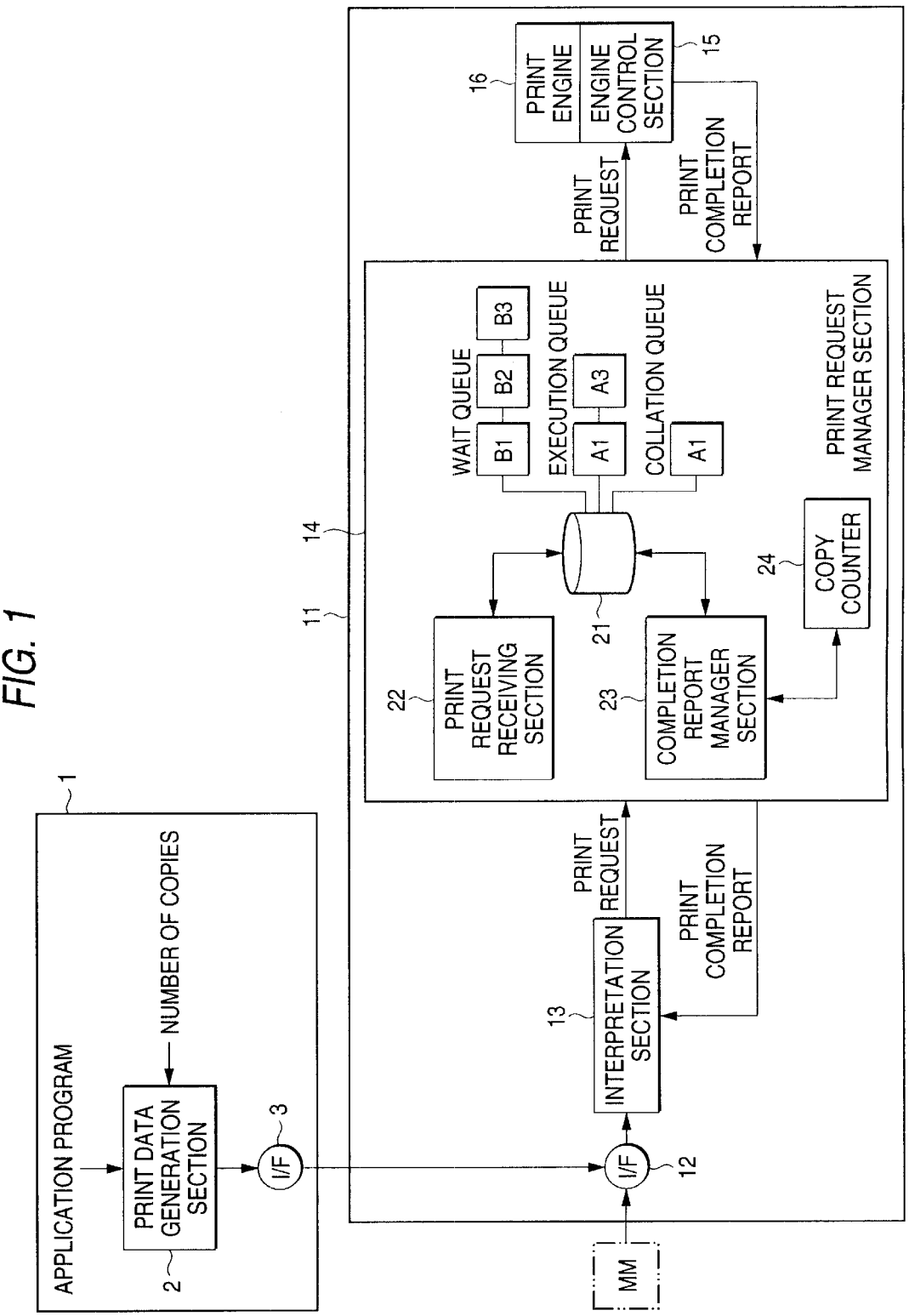
FIG. 1 is a block diagram showing the functional configuration of a print system equipped with a printer according to a first embodiment of the present invention.

A first embodiment of the present invention will now be described by reference to FIGS. 1 through 6. FIG. 1 is a block diagram schematically showing the functions of a print system using a printer according to the first embodiment. A host computer 1 can be embodied in the form of; e.g., a personal computer, a workstation, a word processor, or a digital camera. The host computer 1 comprises a print data generation section 2 and an interface (hereinafter abbreviated an "I/F") 3. The print data generation section 2 converts document data entered by means of an application program, such as a document or a drawing, into print data which the printer 11 can interpret. The I/F 3 transmits the print data to a printer 11 by way of a communications line.

For example, the printer 11, which can be embodied as a larger page printer, comprises an interface (I/F) 12, an interpretation section 13, a print request manager 14, an engine control section 15, and a print engine 16.

The I/F 12 receives print data from the host computer 1 and corresponds to "receiving means." The interpretation section 13 serving as "interpretation means" generates print image data for each page from the received print data and issues a print request. For instance, when the print data received from the host computer 1 correspond to a character code, the interpretation section 13 must perform a required processing operation by reading font data corresponding to the character code in order to print the character code and must convert the character code into final image data for print output purpose. Accordingly, printing a certain page requires only production of bit image data regarding all the characters constituting the page. However, generation of the bit image data regarding the entire page requires consumption of a large amount of memory.

The interpretation section 13 does not generate a print request by retaining the bit image data per se, but holds the bit image data in the form of an intermediate code representing a destination into which font data required for generating the bit image data are stored, the positions where characters are. printed, and the sizes of the characters. Accordingly, the print request (hereinafter referred to also as a "print request structure") generated by the interpretation section 13 on a page-by-page basis comprises intermediate code data representing; e.g., a paper size, the number of copies in which each page is to be printed, designation of single-side/double-side printing, and contents of the page. Thus, in the case of a print request described in the intermediate code, bit image data are produced from the intermediate code and is written into an image buffer, whereby the contents specified by the print request are printed. The present embodiment illustrates, as a preferable example, a case where contents specified by a print request are described in the form of an intermediate code. However, the present invention is not limited to such an example, and contents specified by a print request may be produced in the form of bit image data. However, depending on contents to be printed, the use of an intermediate code for describing the contents specified by a print request yield an advantage of a reduction in the amount of memory required for generating a print request.

The print request manager 14 serving as "print request manager means" stores and manages print requests issued by the interpretation section 13. The thus-stored print requests are entered into the engine control section 15 serving as a portion of "printing means.". The engine control section 15 activates the print engine 16 according to the thus-received print request, thereby effecting a predetermined printing operation. After completion of printing of each page, the engine control section 15 is to report the completion of printing of the page to the print request manager 14. The engine control section 15 and the print engine 16 correspond to "printing means."

The print request manager 14 comprises a print request storage section 21 capable of being expressed as, e.g., print request storage means; a print request receiving section 22 serving as "a print request receiving process"; a completion report manager 23 serving as a "print completion report management process"; and a copy counter 24 capable of being expressed as, e.g., copy number manager means. The storage section 21 may be constituted of; e.g., memory, such as RAM (Random Access Memory). Alternatively, the storage section 21 may be constituted of a mass storage device such as a hard disk drive.

The storage section 21 is provided with three queues. An execution queue corresponds to a "first queue." In principle, the print requests stored in the execution queue are transmitted to and printed by the engine control section 15 in the sequence of storage. Specifically, print processing of the print request is not effected unless the print request is stored in the execution queue. A wait queue stores and holds, in a wait state, a print request relating to another print job differing from the currently-printed print job until completion of printing of the currently-printed preceding print job. After completion of printing of the preceding print job, the individual print requests stored in the wait queue are transferred to the execution queue and are subjected to printing. A collation queue serving as a "second queue" is used at the time of collation printing. The print request for which printing has been performed is transferred to the collation queue from the execution queue, and the print request is stored in the collation queue.

Upon receipt of a print request from the interpretation section 13, the print request receiving section 22 stores the thus received print request into either the execution queue or the wait queue. Upon receipt of a print completion report from the engine control section 15, the completion report manager 23 reports completion of printing to the interpretation section 13 with regard to the print request for which printing has been performed and discards the print request to thereby free the memory block of the storage section 21. Further, at the time of collation printing, the completion report manager 23 transfers a print request between the execution queue and the collation queue to thereby effect collation printing. The copy counter 24 counts the number of printed copies.

The operation of the print system according to the first embodiment will now be described by reference to FIGS. 2 through 6. Hereinafter, steps will be abbreviated "S."

Figure 2:
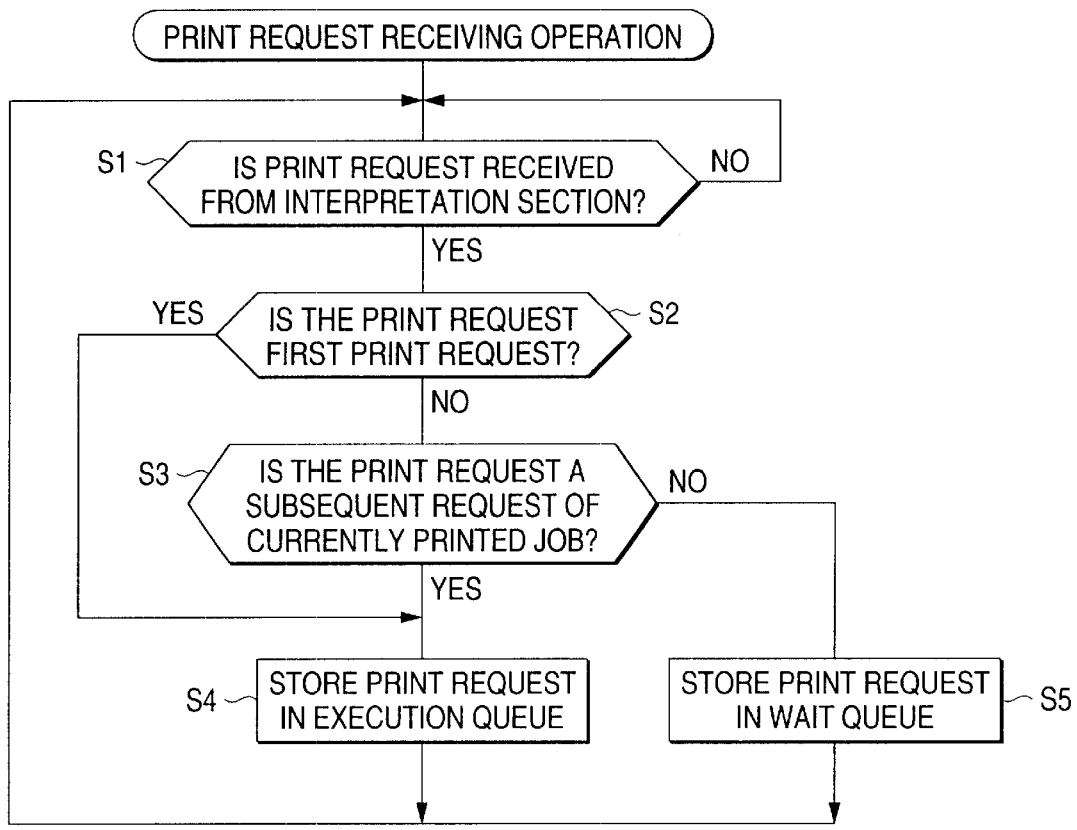
FIG. 2 is a flowchart showing processing for receiving print requests.

FIG. 2 is a flowchart showing receipt of print requests by the print request receiving section 22. First, the print request receiving section 22 monitors whether or not a print request is received from the interpretation section 13 (S1). When an input print request exists, the print request receiving section 22 determines whether or not the thus received print request is a print request for a first print job; namely, whether or not the execution queue is still empty (S2). If the received print request is a print request for the first print job, the print request is stored in the execution queue (S4).

In contrast, if the received print request is not a print request for the first print job, the print request receiving section 22 determines whether or not the received job is a subsequent print request relating to the print job, which is now being printed or will be printed (S3). If the thus received print request is a subsequent request, the print request is stored in the execution queue. In contrast, if the print request is determined to be irrelevant to the currently-printed print job, all print requests relating to the currently-printed print job are stored in the wait queue (S5). In connection with receipt of a print request, consideration must be paid to the fact that a determination is not made as to whether or not the print request relates to a collation printing. During the print request receiving operation, print requests relating to a first-arrived print job are stored in the execution queue in the sequence of arrival, and print requests relating to a second-arrived print job are stored in the wait queue.

Figure 3:
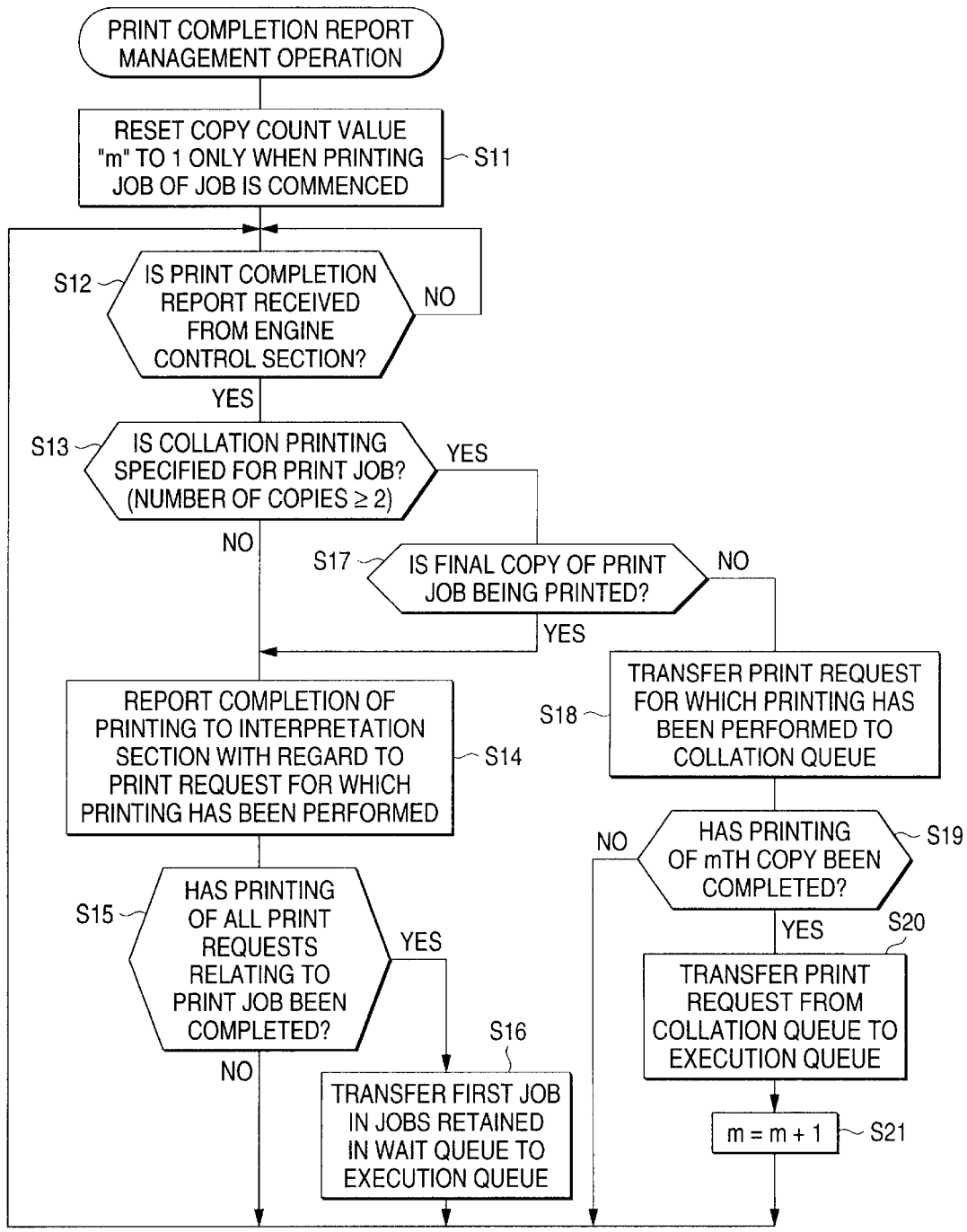
FIG. 3 is a flowchart showing print completion report processing for the purpose of deleting and reserving print requests on the basis of a print completion report.

FIG. 3 is a flowchart showing the management of the print completion reports by the completion report manager 23. First, when printing of a new print job is commenced, a copy count value "m" used for counting the number of copies is reset to 1 (S11). The copy count value "m" is initialized only when printing of a print job is commenced.

A determination is made and monitored as to whether or not a print completion report is received from the engine control section 15 (S12). In another processing differing from the management processing, the engine control section 15 prints in sequence the print requests received from the execution queue. When the printing of a print request is completed normally, the engine control section 15 reports to the print request manager 14 completion of printing of the received print request. Upon receipt of the print completion report from the engine control section 15, the print request manager 14 determines whether or not there has been issued an instruction for subjecting to collation printing the print request (for which printing has been performed) pertaining to the print completion report; namely, the print request manger 14 determines whether or not the print request pertains to a print job for which collation printing is currently being performed (S13).

At least two types of methods can be employed for determining whether or not collation printing is designated. According to a first method, all print jobs, which are to be printed in two or more copies, are handled as print jobs to be subjected to collation printing. According to a second method, only a print job which is explicitly designated by a collation printing instruction command issued by the host computer 1 is handled as a print job to be subjected to collation printing. Although either of the two methods may be adopted, the first method is adopted in the first embodiment. If the number of copies to be produced (hereinafter referred to simply as "copy number") Cn directed by the host computer 1 is 2 or more, in step. S13 there is made a determination that a print job relating to the copy number Cn is to be subjected to collation printing. As a result, collation printing can be effected without modification of the contents of a printer driver installed in the host computer 1.

In the case where a print request is not subjected to collation printing (when NO is selected in S13), a page relating to the print request has already been printed, and there is no need to refer to this print request again. In short, the print request is unnecessary. In connection with the print request reported by the engine control section 15, completion of printing is reported to the interpretation section 13. The print request for which printing has been performed is deleted from the execution queue, thus freeing the memory block (S14).

Next, a determination is made as to whether or not printing of the currently-printed print job is completed (S15). If the printing operation is not yet completed, processing returns to S12. In contrast, if processing of the print job is completed as a result of processing of all print requests relating to the print job (YES is selected in step S15), there is selected a print job at the head end of the wait queue where one or a plurality of print jobs are stored in and remain in a wait state, and all print requests relating to this print job are transferred to the execution queue (S16). After transfer from the wait queue to the execution queue of the print job held in a wait state, the copy count value "m" is initialized, and the above-described processing is repeatedly effected.

The above-described processing flow relates to ordinary printing, in which the print job is not subjected to collation printing. In the case where the copy number Cn is 2 or more, a print job relating to the copy number is determined to be subjected to collation printing (when YES is selected in S13), and a determination is made as to whether or not the final copy of the print job for which collation printing is specified is being printed (S17). If the final copy is not being printed, a report about completion of printing is issued by the engine control section 15, and the print request for which printing has been performed is transferred from the execution queue to the collation queue and stored therein (S18). Next, a determination is made as to whether or not printing of the $m^{th}$ copy of the print job is completed; namely, a determination is made as to whether or not printing on a per-copy basis a print request for which collation printing is specified is completed (S19). If printing the print request on a per-copy basis is not yet completed (when NO is selected in S19), processing returns to S12.

As mentioned above, in a case where collation printing is specified for a print job, print requests for the print job for which printing has been performed are transferred to the collation queue from the execution queue in sequence every time a report about completion of printing is issued. Completion of printing is not reported to the interpretation section 13. If printing of the print request on a per-copy basis is completed (when YES is selected in S19) the execution queue becomes empty, and all the print jobs to be subjected to collation printing are transferred to the collation queue. All the print requests that are reserved in the collation queue are again transferred to the execution queue (S20), the copy count value "m" is incremented by one, and processing returns to S12 (S21). Every time printing of a print request on a per-copy basis is completed, the print queue is transferred to the execution queue from the collation queue. As a result, individual print requests can be repeatedly input to the engine control section 15, whereby the print job can be printed in a collated manner.

When the final copy of the print job for which collation printing is specified is commenced; namely, when the copy count value "m" matches the copy number Cn, YES is selected in S17, and processing proceeds to S14. With regard to the print request for which printing has been performed, completion of printing is reported to the interpretation section 13, and the thus-printing print request is deleted, thereby freeing the memory block.

When printing of the final copy is commenced, the print requests for which printing has been performed are not usually used again. Therefore, these print requests are not transferred to the collation queue but are deleted from the execution queue. In other words, the final copy is printed in the same way as in ordinary printing. The memory block is immediately freed, and the amount of available memory can be increased, which in turn results in an increase in the number of opportunities to receive another print job.

The present invention is not limited to the above example, and the print requests for which printing has been performed. may be retained until printing of the final copy of the print job is completed. In other words, the print system may be arranged in such a way as to eliminate processing relating to S17 and such that processing proceeds to S18 when YES is selected in S13.

Figure 4:
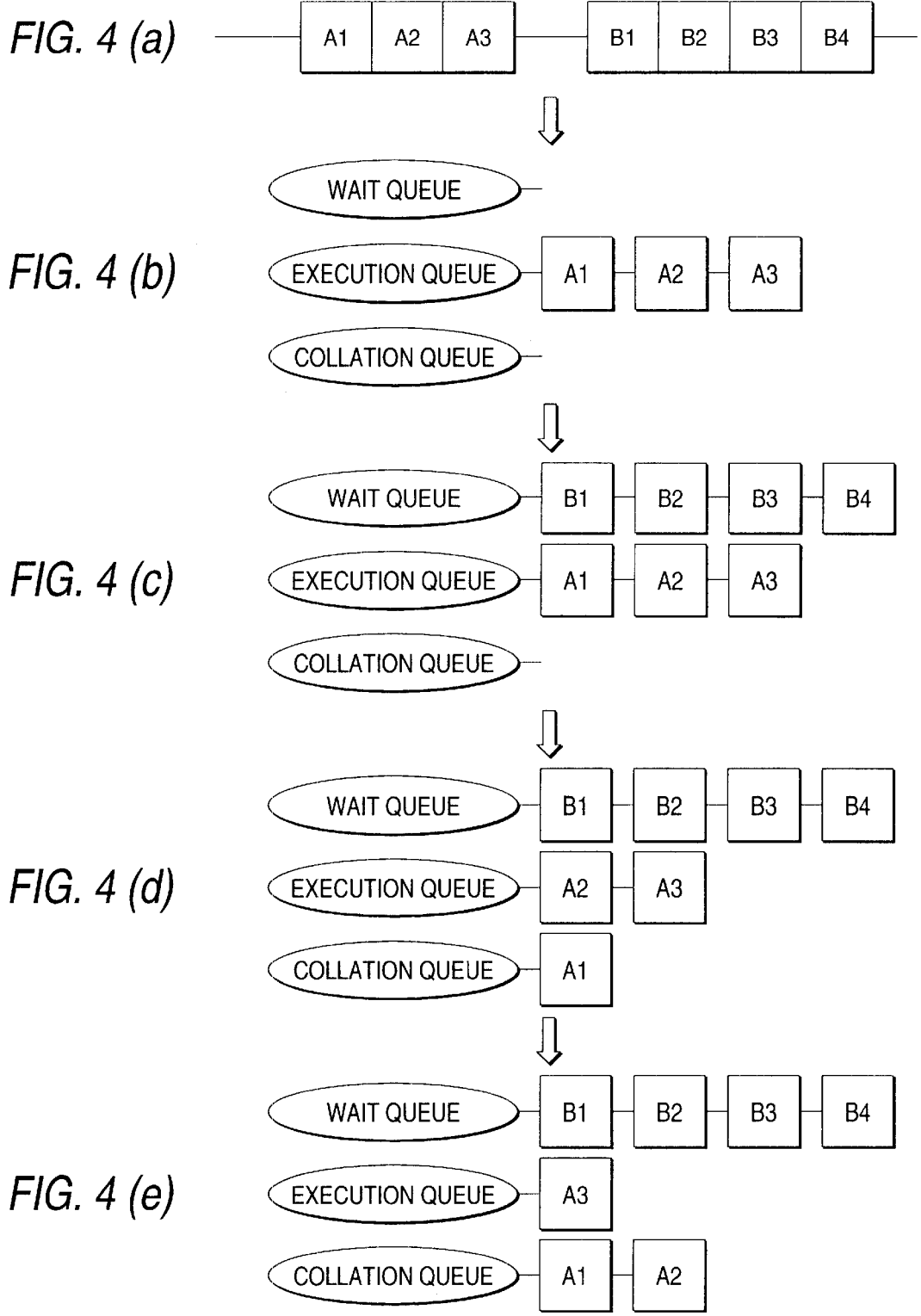
FIG. 4 is a descriptive view for showing changes in the state of execution queues, that of a wait queue, and that of a collation queue.

FIG. 4 is descriptive drawing diagrammatically showing changes in the states of individual queues. As show in (a), changes in the state of individual queues will now be described with reference to a case where two print jobs A and B are input from the host computer 1. Print job A comprises a total of three pages; i.e., pg. A1, pg. A2, and pg. A3, and the copy number Cn of the print job A is set to 2 or more. Print job B comprises four pages; i.e., pg. B1, pg. B2, pg. B3, and pg. B4.

When the print job A, which is transmitted earlier than the print job B, is received by the printer 11, print requests relating to the respective pages A1 through A3 of the print job A are generated, as shown in (b). As shown in FIG. (c), print requests relating to the respective pages B1 through B4 of the print job B, which is received so as to lag behind the print job A, are stored in the wait queue. Depending on the processing speed of the interpretation section 13 or the speed of the engine, printing of the print requests is commenced substantially in tandem with generation of the same. Accordingly, the states such as those shown in (b) and (c) in FIG. 4 may not arise as initial states. Therefore, for convenience of explanation, the print requests relating to the respective print jobs A and. B are stored in the initial state.

As shown in (d), when the first page A1 of the print job A for which collation printing is specified is printed, and when a report about completion of printing is issued by the engine control section 15, the print request relating to the page A1 is transferred from the execution queue to the collation queue. Similarly, as shown in (e), when printing of the next page A2 is completed, the print request relating to the page A2 is transferred from the execution queue to the collation queue. As shown in (f) in FIG. 5, when printing of the final page A3 is completed and the print requests are transferred to the collation queue, all the print requests to be subjected to collation printing are stored in the collation queue, and the execution queue becomes empty.

As shown in (g), all the print requests stored in the collation queue are again transferred to the execution queue, and the print requests relating to the respective pages A1 to A3 are supplied to the engine control section 15, whereby printing of a second copy of the print job is commenced. Similarly, processing operations relating to (c) to (e) in FIG. 4 and (f), (g) in FIG. 5 are repeated a number of times corresponding to the number of copies. As shown in (h), after completion of printing of the print job A, both the execution queue and the collation queue become empty.

As shown in (i), the print requests for the subsequent print job B, which are held in the wait queue, are transferred to the execution queue. If the copy number Cn of the print job B is set to 2 or more, the print job B is subjected to the same processing as performed for the print job A. However, if the copy number Cn of the print job B is 1, the print job B is subjected to ordinary printing. Hence, a print job for which printing has been performed is immediately deleted from the execution queue, thereby releasing memory. Although not specifically shown in the drawings, during collation printing the execution queue is occupied for a period of time corresponding to the number of copies and pages. If the print system receives another print job from another client during collation printing, the thus received print job is stored in the wait queue, within the limits of the storage capacity of the storage section 21.

Figure 6:
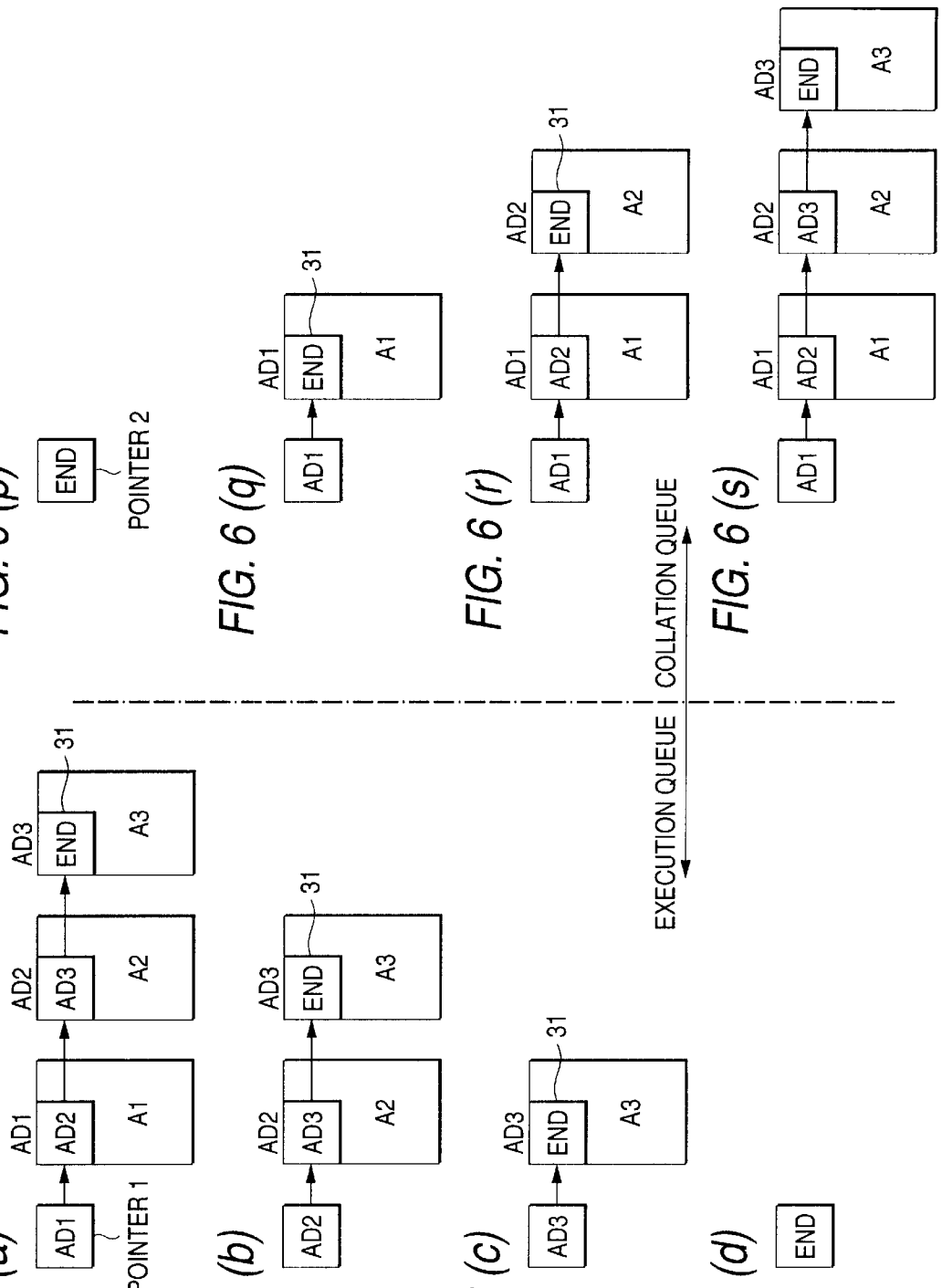
FIG. 6 is a descriptive view showing a method of reading individual print requests, which are linked together by way of next address designation sections, in sequence and by means of pointers.

FIG. 6 is a descriptive view showing a specific example in which print requests are transferred between queues. The respective states of the execution queue are assigned (a) to (d) and are shown in the left side in FIG. 6, and the respective states of the collation queue are assigned (p) to (s) and are shown in the right side in FIG. 6.

The print requests relating to the respective pages A1 to A3 are stored in the storage section 21. The print request elating to page A1 is stored while being headed by address AD1; the print request relating to page A2 is stored while being headed by address AD2; and the print request relating to page A3 is stored while being headed by address AD3. Each of the print requests is provided with a next address designation section 31 for storing the header address of the print request; relating to the next page. More specifically, as shown in (a) in FIG. 6, a header address AD2 of the print request relating to the next page A2 is stored in the next address designation section 31 provided in the print request relating to page A1. Similarly, a header address AD3 of the print request relating, to the next page A3 is stored in the next address designation section 31 provided in the print request relating to page A2. Information (End) representing completion of a print job is stored in the next address designation section 31 of the final page A3. As mentioned above, the respective print requests are linked together by way of the respective next address designation sections 31.

The header address AD1 of the first page A1 is set in a pointer 1. Provided that a first print request is read on the basis of the address designated by the pointer 1, the header address of the print request relating to the next page is stored in the next address designation section 31 of the first print request. The print requests can be read in the sequence of issuance by updating the address stored in the pointer 1 to the header address of the next page. For example, as shown in (b) in FIG. 6, when the print request relating to the first page A1 is read and transmitted to the print engine control section 15, the address stored in the pointer 1 is rewritten to the header address AD2. Further, as shown in (c) in FIG. 6, after the print request relating to the page A2 has been transmitted to the engine control section 15, the address stored in the pointer 1 is rewritten to the header address AD3. As shown in (d) in FIG. 6, after processing of the print request relating to the final page A3, the contents of the pointer 1 are updated to the information (End) representing completion of the print job, there by reporting completion of the print job.

Next, attention is directed to the collation queue. As shown in (p) in FIG. 6, no print requests to be printed exist, before commencement of collation printing, and hence the job completion information (End) is stored in a pointer 2. When the print request relating to page A1 is processed, the header address AD1 of the print request relating to page A1 is set in the pointer 2, as shown in (q) in FIG. 6. Further, the job completion information (End) is set in the next address designation section 31 of the print request relating to page A2. Next, after processing of the print request relating to page A2, as shown in (r) in FIG. 6, the header address AD2 is set in the next address designation section 31 of page A1, and the job completion information (End) is set in the next address designation section 31 of page A2. After processing of the print request relating to page A3, as shown in (s) in FIG. 6, the header address AD3 is set in the next address designation section 31 of page A2, and the job completion information is set in the next address designation section 31 of the final page A3.

As mentioned above, at the time of collation printing, the collation queue reestablishes a link among the print requests every time the print requests stored in the execution queue are processed. A print request can be transferred between queues by rewriting only the contents of the pointer or the address designation section 31 without involvement of a change in the memory block of the storage section 21 where the print requests a restored. Although not specifically shown in the drawings, the wait queue also effects the same processing through use of the pointer and the address designation section 31.

The print system according to the first embodiment having the foregoing configuration yields the following advantages:

First, the print requests for which printing has been performed are reserved during collation printing, and each of the print requests is repeatedly input to the engine control section 15 according to the number of copies. Therefore, collation printing can be effected by use of a simple configuration without involvement of addition of a special command or a memory block for collation printing purpose.

For example, there may be conceived a method by which a memory block for collation printing purpose is reserved by means of a command sent from the host computer and collation printing is effected by repeatedly reading the data stored in the memory block. However, such a method requires reservation of a memory block in consideration of a sufficient margin of memory, thereby deteriorating the efficiency of use of memory resources and diminishing opportunities to receiver other print jobs. In contrast, the print system according to the first embodiment does not reserve a special memory block and stores only print requests for which collation printing is specified. Therefore, the print system can effect collation printing without complicating memory control. Further, the memory resources can be effectively utilized.

Second, print data are not stored exactly as they are, but print requests relating to the print data are produced in the form of an intermediate code. Accordingly, printing of the second or subsequent copies of the print request does not require interpretation of the print data, thus shortening a print time and improving the speed of collation printing.

Third, when printing of the final copy of the print data is commenced, completion of printing with regard to the print request for which printing has been performed is reported to the interpretation section 13, thereby freeing the memory block. Thus, the memory block is released at an early time, thereby increasing the amount of available memory and opportunities to receiver other print jobs.

Fourth, an execution queue and a collation queue are introduced into the print system, and the print requests for which printing has been performed are transferred from the execution queue to the collation queue and stored therein. The print request is re-transferred from the collation queue to the execution queue every time printing one copy of the print job is completed. Accordingly, the print system can effect collation printing through use of a simple configuration.

Fifth, the print request is transferred between the execution queue and the collation queue by rewriting the data stored in the pointer and the next address designation section 31. In contrast with a case where the data regarding the print request are copied to a predetermined memory block, data can be transferred more quickly.

Sixth, in a case where a designated number of copies of a print job is 2 or more than, the print job is deemed to be subjected to collation printing. For instance, there is no need to provide the print system with a special button, such as a "collation print button." Therefore, the print system can effect collation printing without modification of an existing printer driver or printer utility.

Seventh, in a case where the copy number Cn is greater than the number of paper delivery bins Nout (Cn>Nout); namely, in a case where Cn≧Nout+1, collation printing can be effected, thus improving ease-of-use.

Second Embodiment

Next, a print system according to a second embodiment of the present invention will be described by reference to FIGS. 7 and 8. The print system of the second embodiment is characterized in that occurrence of memory shortage is monitored and that in the event of occurrence of memory shortage a print mode is switched to an ordinary print mode. In the second embodiment, the constituent elements which are the same as those employed in the first embodiment are assigned the same reference numerals, and repetition of their explanations is omitted here.

Figure 7:
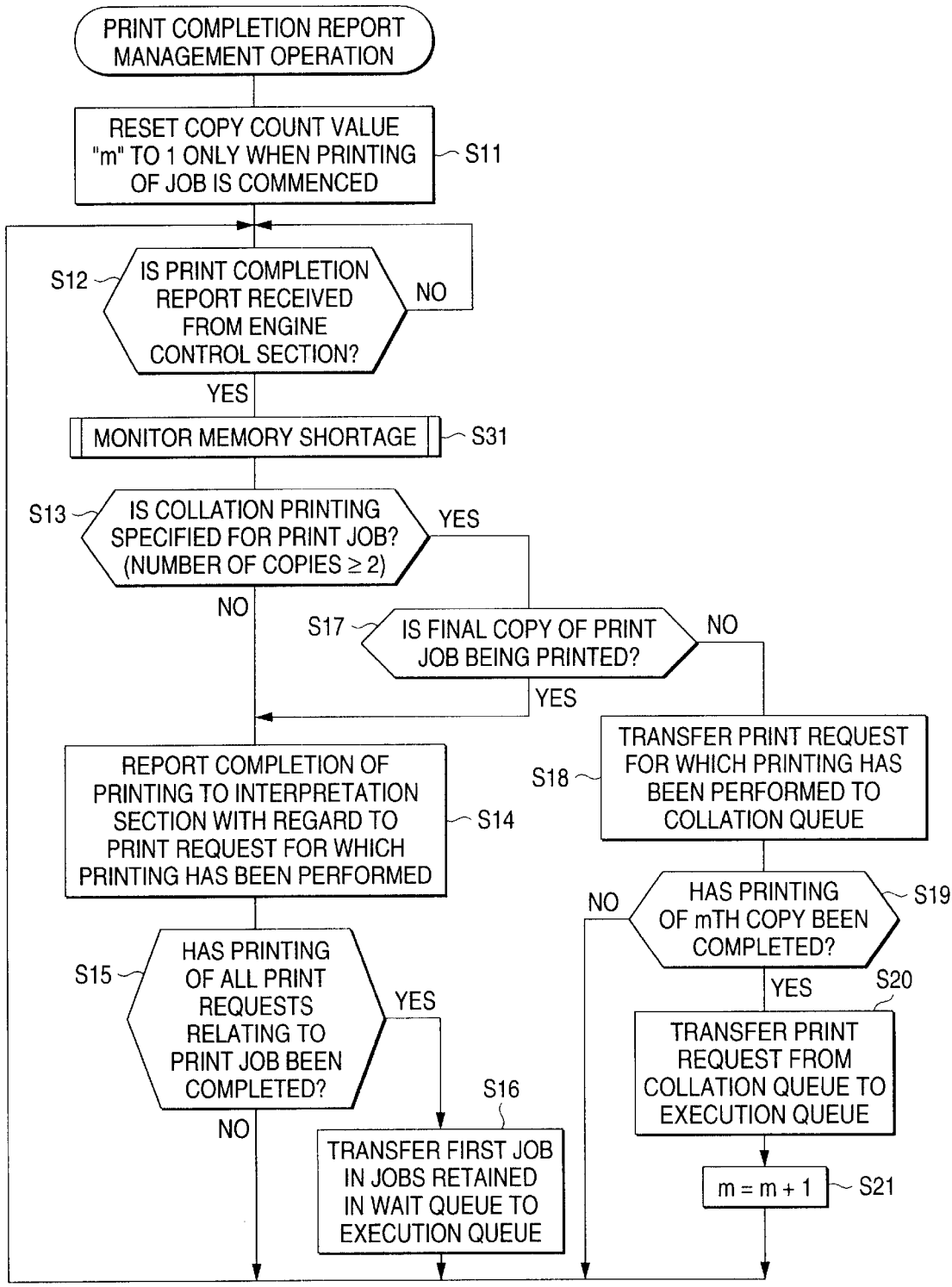
FIG. 7 is a flowchart showing print completion report management processing according to a second embodiment of the present invention.

FIG. 7 is a flowchart relating to print completion report management according to the second embodiment. The processing comprises steps S11 to S21 shown in FIG. 3. Further, for example, a step for monitoring memory shortage (i.e., S31) is additionally provided subsequent to S12. Memory shortage monitoring processing will now be described by reference to a flowchart shown in FIG. 8. First, whether or not memory becomes insufficient is monitored (S41). If memory shortage arises, the state of the memory shortage is checked (S42). More specifically, in S42, a determination is made as to whether or not memory has become insufficient during the course of preparation of a print request relating to the print job for which printing is currently being performed. Here, the print job for which printing is currently being performed includes not only a print job for which printing is now being performed but also a print job for which printing is commenced.

In the event of occurrence of memory shortage during the course of preparation of the print job for which printing is now being performed (when YES is selected in S42), the memory becomes insufficient before all the print requests to be subjected to collation printing are stored, with the result that collation printing cannot be effected. In this case, the copy number Cn specified by the host computer 1 is reset to "1"(S43), thereby switching the print mode from the collation print mode to an ordinary print mode. Next, in connection with the print requests which are already stored in the collation queue and for which printing has been performed, completion of printing is reported to the interpretation section 13, and the print requests for which printing has been performed are deleted, thus releasing memory (S44).

In contrast, in the event of occurrence of memory shortage during the course of preparation of print requests relating to another print job held in a wait state (when NO is selected in i S42), memory shortage may be eliminated, so long as the processing of the print job (i.e., a preceding print job) for which printing is now being performed is completed.

Therefore, the interpretation section 13 is instructed to interrupt generation of a new print request until the processing of the preceding print job is completed (S45).

The second embodiment can yield the same advantageous results as those yielded by the first embodiment and can further yield the following advantageous results.

First, in the event of occurrence of memory shortage, the copy number Cn is reset to "1" to thereby effect ordinary printing. In contrast with collation printing, even when an available memory block is of small size, only the first copy of the print job can be printed, thus improving ease-of-use of the print system. Particularly, the present invention embodies collation printing through use of a simple configuration without checking the amount of memory required for effecting collation printing in advance or without retro-fitting additional memory or an auxiliary storage device to the print system beforehand. Plainly speaking, the print system's performance is effected to the extent practical. Accordingly, there still remains a probability of collation printing ending in failure, depending on the relationship between the amount of available memory and the amount of data regarding print requests. Even in such a case, only one copy of the print job can be printed, and hence the ease-of-use of the print system is enhanced. Here, when the copy number Cn is reset to "1," the host computer 1 may be notified of such resetting of the copy number.

Second, whether or not memory shortage occurs in connection with the print job for which printing is now being performed is monitored. If memory shortage arises in connection with another print job held in a wait state, generation of print requests relating to the print job is suspended until collation printing is completed. Therefore, interruption of collation printing, which would otherwise be caused by another print job received later, can be prevented, thus improving the ease-of-use of the print system.

Persons who are versed in this field can modify the embodiments described herein through various addition within the scope of the present invention. For example, as shown in FIG. 1, the present invention may be embodied by storing a predetermined program in a recording medium MM and by loading the program into a printer. For instance, the recording medium comprises a tangible storage medium such as ROM, an FD, CD-ROM, or a memory card, as well as a communications medium downloaded by way of a communications network.

Figure 8:
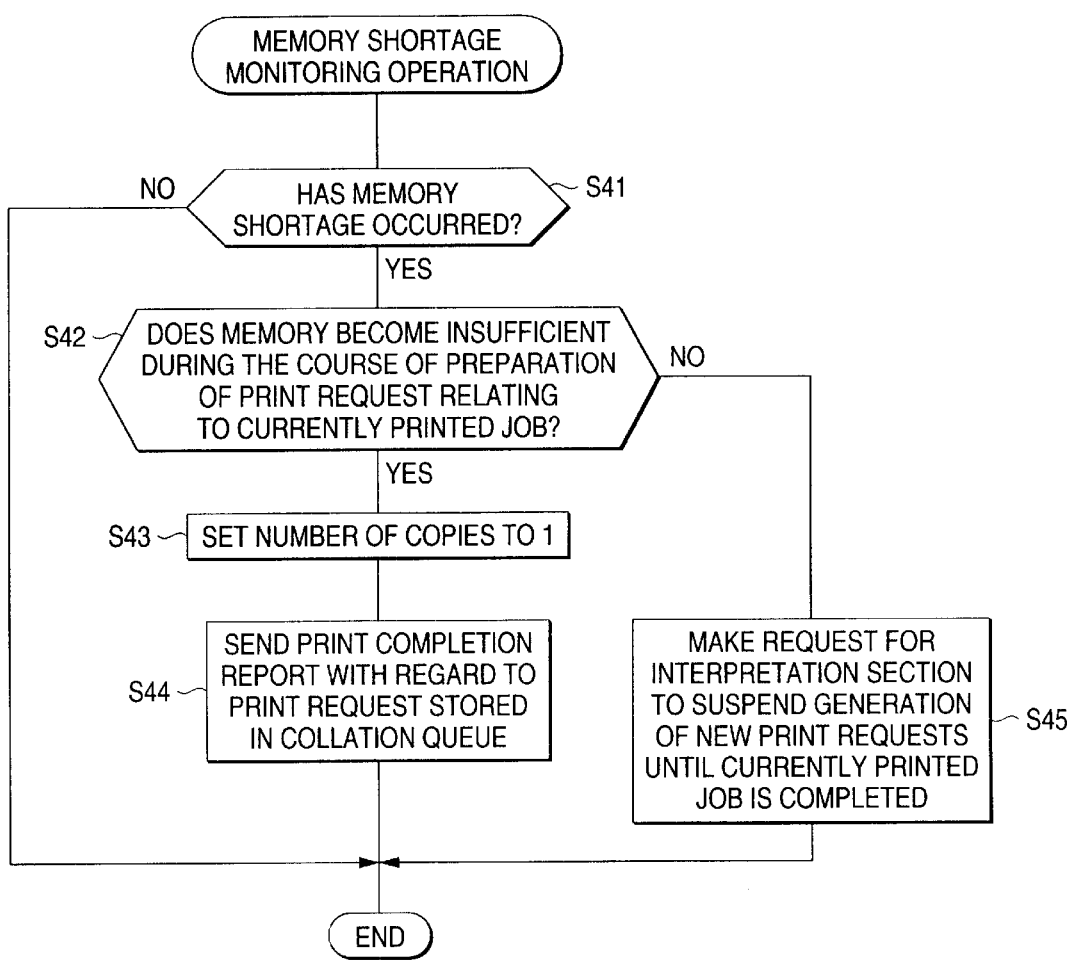
FIG. 8 is a flowchart showing a specific example of memory shortage monitoring processing indicated by S31 shown in FIG. 7.

Further, the processing method performed in the event of memory shortage is not limited to the example shown in FIG. 8. Other methods such as those shown below may also be adopted. For example, in relation to a case where three copies of a document including four pages; i.e., pg. 1 to pg. 4, are to be printed, an explanation will be given of a situation in which memory becomes insufficient when a print request relating to pg. 4 is generated.

According to a first alternative method, after three copies of the document ranging from pg. 1 through pg. 3 have been printed in sequence, the print requests relating to pg. 1 through pg. 3 are deleted, thus freeing memory. Then, three copies of pg. 4 are duplicated. In this case, the sheets on which pg. 4 has already been printed must be manually re-arranged. However, the host computer is required to transfer data only once.

According to a second alternative method, collation, printing is completed after printing of three copies of the document ranging from pg. 1 to pg. 3, and the host computer is notified of collation printing of a portion of the document having been effected. Data regarding only pg. 4 are transmitted.

According to a third alternative method, print requests are reserved in the collation queue while being compressed, and the thus-compressed print requests are decompressed during the course of being transferred from the collation queue to the execution queue. For example, print requests relating to pg. 1 to pg. 3 are stored in the collation queue while being compressed, thereby reserving available memory. After printing of print data regarding pg. 4, the print request relating to pg. 4 is compressed and stored in the collation queue. Next, the print request relating to pg. 1 is decompressed, and print data regarding pg. 1 are printed.

In relation to description of a print request in the form of an intermediate code, the present invention can be expressed as follows:

A printer for effecting predetermined printing by activation of printing means on the basis of input print data, comprising:

receiving means for receiving print data;

interpretation means which interprets the received print data and issues print requests including intermediate code data, wherein, the intermediate code data represent information used for generating image data for printing purposes; and print request manager means which temporarily stores the print requests issued by the interpretation means, prints the thus-stored print requests by entering the print requests into the printing means, and reports to the interpretation means completion of printing of the print requests, on the basis of a report about completion of printing issued by the printing means, wherein in a case where collation printing is specified for the print requests, the print request manager means repeatedly inputs to the printing means each of the print requests to be subjected to collation printing until printing of a specified number of copies is completed.

As mentioned previously, in the printer and the printing method according to the present invention, print requests for which printing has been performed are reserved, and the print requests are repeatedly input to the printing means according to the number of copies. Thus, collation printing can be effected through use of a simple configuration. Further, repeated use of the already-existing print requests eliminates the necessity for reinterpretation of the print data at the time of printing of the second or subsequent copies of the print job, thus shortening print time.

When the final copy of the print job is commenced, the printing is carried out while the print request is deleted, thereby releasing the memory block at an early time and increasing the amount of available memory. As a result, opportunities to receive other print jobs can be increased.

Further, in the event of occurrence of memory failure, the copy number Cn is reset to "1" to thereby effect ordinary printing, thus improving ease-of-use of the print system.

The embodiments of the present invention are described above, however, these embodiments are examples for explaining the present invention and the present invention is not limited to only these embodiments. Therefore, the present invention can be also embodied in various embodiments other than the above embodiments.

What is claimed is:

1. A printer for effecting predetermined printing by activation of printing means based on input print data, comprising:

receiving means for receiving print data;

interpretation means which interprets the received print data and issues print requests; and print request manager means which temporarily stores the print requests issued by said interpretation means, prints the thus-stored print requests by entering the print requests into said printing means, and reports to said interpretation means completion of printing of the print requests, based on a report about completion of printing issued by said printing means, wherein, in a case where collation printing is specified for the print requests, said print request manager means repeatedly inputs each of the print requests to be subjected to collation printing to said printing means until printing of designated number of copies is completed.

2. A printer according to claim 1, wherein said print request manager means does not send the print completion report to said interpretation means and retains the print request until printing of a final copy of the print request to be subjected to collation printing is commenced; and when printing of the final copy is commenced, said print request manager means also sends the print completion report to said interpretation means, based on the print completion report issued by said printing means.

3. A printer according to claim 1, wherein said print request manager means comprises:

a first queue for processing the print requests stored therein in a predetermined sequence; and a second queue for transferring the print requests for which printing has been performed from said first queue and storing the thus-transferred print queues therein when the print completion report is issued by said printing means with regard to the print requests stored in said first queue, wherein, when collation printing of one copy is completed, the print request stored in said second queue is transferred to said first queue, so that the print requests to be subjected to collation printing can be repeatedly input to said printing means until printing of the designated number of copies is completed.

4. A printer according to claim 3, wherein until commencement of printing of the final copy relating to the print request to be subjected to collation printing, said print request manager means does not send any print completion report to said interpretation means but transfers the print request between said first queue and said second queue; and when printing of the final copy is commenced, said print request manger means sends the print completion report to said interpretation means with regard to the print requests for which printing has been performed, and the print requests for which printing has been performed are not transferred to the second queue but are deleted from the first queue.

5. A printer according to claim 3, further comprising a pointer for specifying a header address of a next print request to be printed, and a next address designation section which is provided in each of the print requests and is used for designating the header address of the next print request, wherein said print request manager means transfers the print requests between said first queue and said second queue by re-writing data stored in said pointer and said address designation sections.

6. A printer according to claim 1, wherein said, print request manger means monitors whether or not a memory block for storing the print requests becomes insufficient, and in the event of occurrence of memory shortage, directed number of copies is reset to "1".

7. A printer according to claim 6, wherein if memory shortage occurs during a course of storage of the print request relating to a print job for which printing is currently being performed, said print request manager means resets the directed number of copies to 1; and if memory shortage occurs during the course of storage of a print request of another print job differing from the preceding print job, generation of the print request relating to the another print job is suspended until printing of the preceding print job is completed.

8. A printer according to claim 1, wherein if the directed number of copies is 2 or more, collation printing is deemed as being specified for the print job.

9. A printing method by which predetermined printing is effected by actuation of printing means based on input print data, comprising steps of:

monitoring whether or not interpretation means issues a print request based on the input print data;

temporarily storing the print request when the print request is issued;

monitoring whether or not the printing means issues a print completion report with regard to the print request which are stored;

determining whether or not the print request for which the print completion report has been issued is designated to be subjected to collation printing;

determining whether or not the print request for which the print completion report has been issued pertains to a final copy of designated number of copies in a case where the print request is designated to be subjected to collation printing;

retaining the print request designated to be subjected to collation printing without issuing a print completion report to the interpretation means until the print request for which the print completion report has been issued is determined to pertain to a portion of the final copy;

repeatedly inputting the print requests, which are retained and are designated to be subjected to collation printing, to the printing means according to the number of copies; and issuing the print completion report to the interpretation means based on the print completion report issued by the printing means after the print request, for which the print completion report has been issued, has been determined to pertain to a portion of the final copy.

10. A printing method according to claim 9, further comprising:

a step of monitoring whether or not a memory block for storing the print request becomes insufficient; and a step of resetting the designated number of copies to 1 when the memory block becomes insufficient.

11. A printing method by which predetermined printing is effected by activation of printing means based on input print data, the method comprising:

(1) a print request receiving process comprising:

a step of monitoring whether or not interpretation means issues a print request based on the input print data; and a step of temporarily storing the print request in a first queue when the print request is issued; and (2) a print completion report management process comprising:

a step of monitoring whether or not the printing means issues a print completion report with regard to the print request stored in the first queue;

a step of determining whether or not collation printing is specified for the print request for which the print completion report has been issued when the print completion report is issued;

a step of determining whether or not the print request for which the print completion report has been issued pertains to a portion of a final copy of designated number of copies when collation printing is specified for the print job;

a step of storing into a second queue the print request which is stored in the first queue and for which printing has been performed until the print request for which the print completion report has been issued is determined to pertain to a portion of the final copy;

a step of determining whether or not printing of one copy to be subjected to collation printing is completed;

a step of repeatedly inputting to the input means the print requests to be subjected to collation printing by transferring the print requests retained in the second queue to the first queue according to the number of copies, when one copy of the print request to be subjected to collation printing is completed; and a step of issuing the print completion report to the interpretation means based on the print completion report issued by the printing means after the print request, for which the print completion report has been issued, has been determined to pertain to a portion of the final copy, thereby deleting from the first queue the print request for which printing has been performed.

12. A printing method according to claim 11, further comprising:

a step of monitoring whether or not a memory block for storing the print request becomes insufficient; and a step of resetting the designated number of copies to 1 when the memory block becomes insufficient.

13. A recording medium having recorded thereon a computer program for controlling a printer, wherein the computer program comprises:

an interpretation function of issuing a print request by interpretation of received print data; and a print request management function of temporarily storing the print request issued by means of the interpretation function, inputting the thus-stored print request to printing means such that the printing means prints performs printing, and issuing to the interpretation function a print completion report with regard to the print request based on the print completion report issued by the printing means; and wherein, in a case where collation printing is specified for the print request, the print request management function repeatedly inputs to the printing means the print request to be subjected to collation printing until printing of the designated number of copies is completed.

14. A recording medium on which a computer program for managing a print request issued based on print data is recorded, wherein the program comprises:

a function for storing the thus-issued print request into a first queue;

a function for determining whether or not collation printing is specified for the print request stored in the first queue;

a function of monitoring whether or not printing means issues a print completion report;

a function for determining whether or not the print request for which the print completion report has been issued pertains to a portion of a final copy of designated number of copies when collation printing is specified forth print request;

a function for transferring the print request for which printing has been performed to a second queue and retaining the print request in the second queue until the print request for which the print completion report has been issued is determined to pertain to a portion of the final copy;

a function for repeatedly inputting to the printing means the print request to be subjected to collation printing according to the designated number of copies by transferring the print request retained in the second queue to the first queue, when printing of one copy of the print request to be subjected to collation printing is completed; and a function for deleting the print request for which printing has been performed from the first queue on the basis of the print completion report, after the print request, for which the print completion report has been issued, has been determined to pertain to a portion of the final copy.

* * * * *